April 11, 1933.   J. C. WALTER ET AL   1,903,732
CONVEYER
Filed Aug. 9, 1930   3 Sheets-Sheet 1
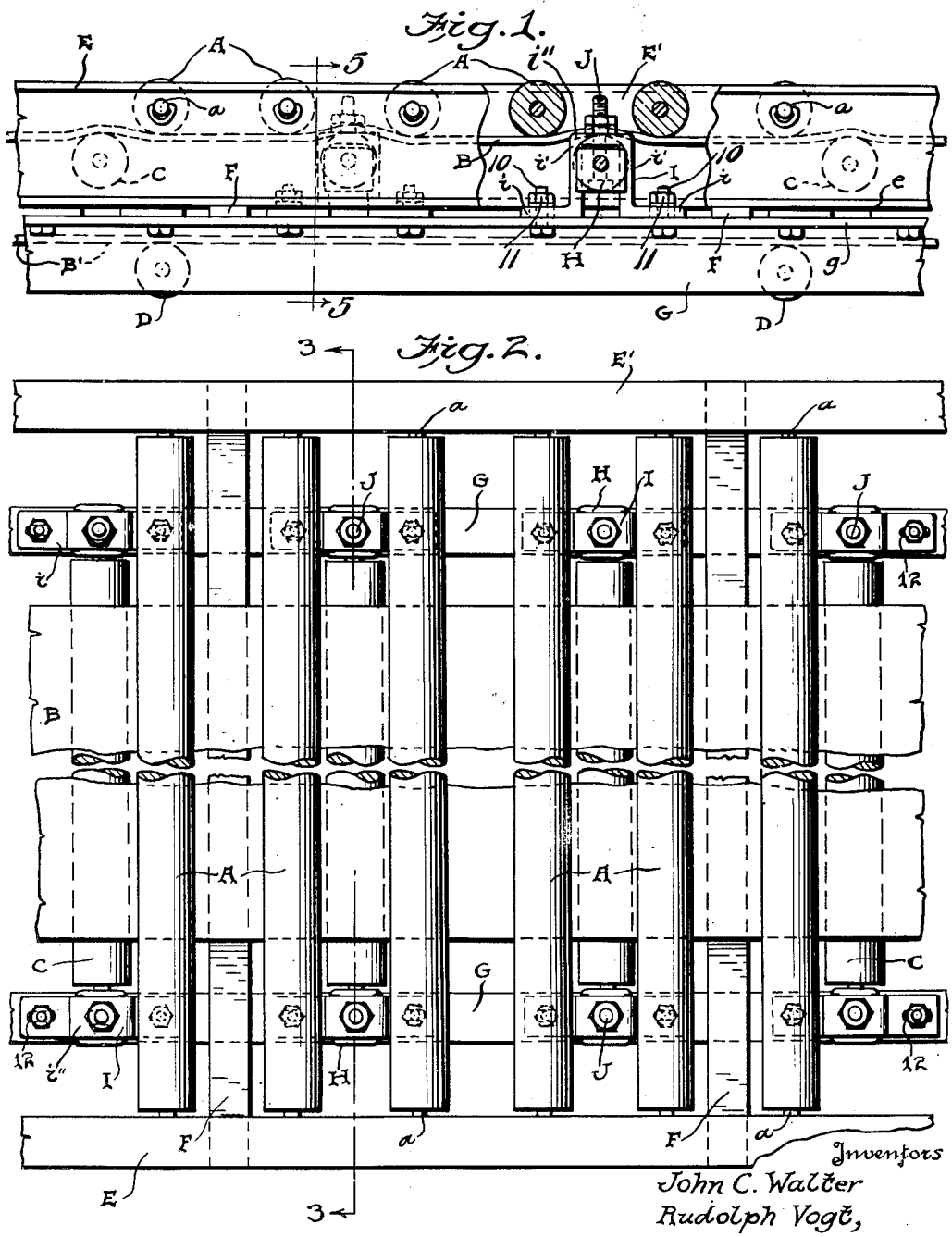
Inventors
John C. Walter
Rudolph Voge,
By C. J. Stockman
Attorney

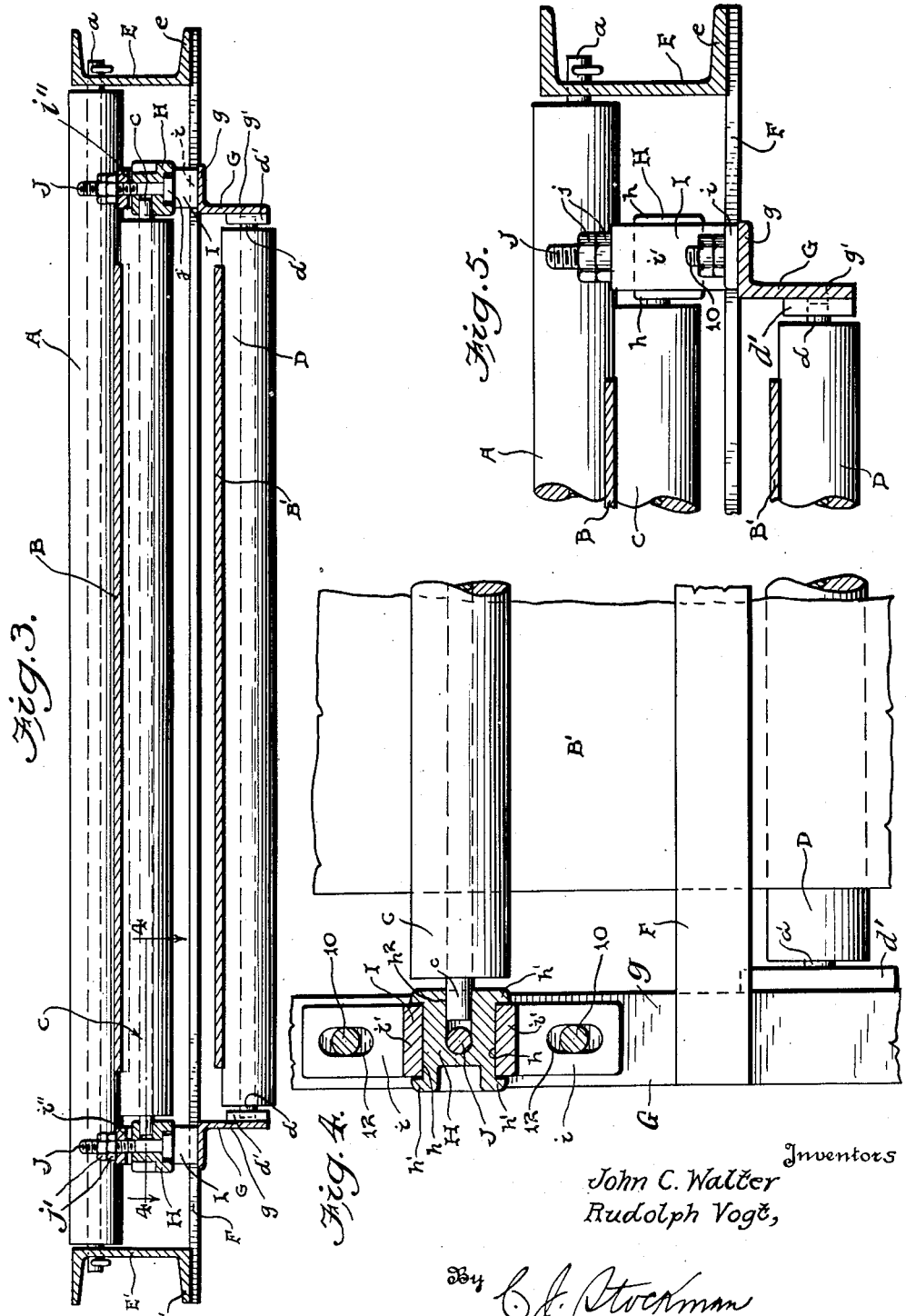

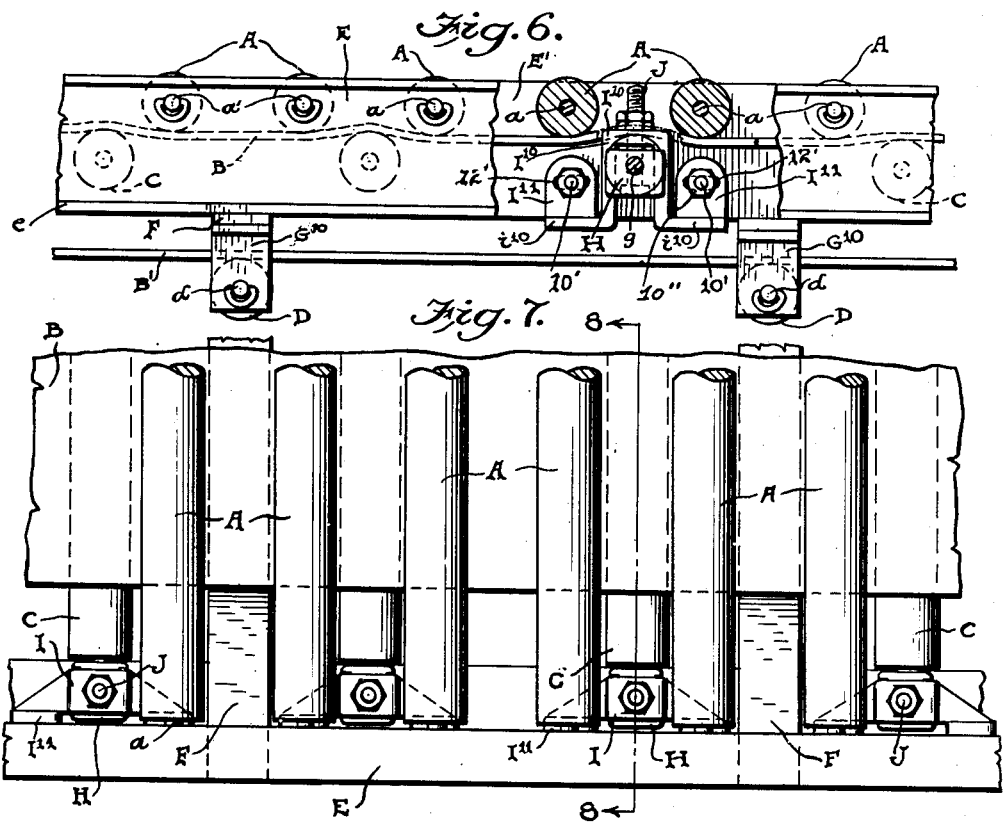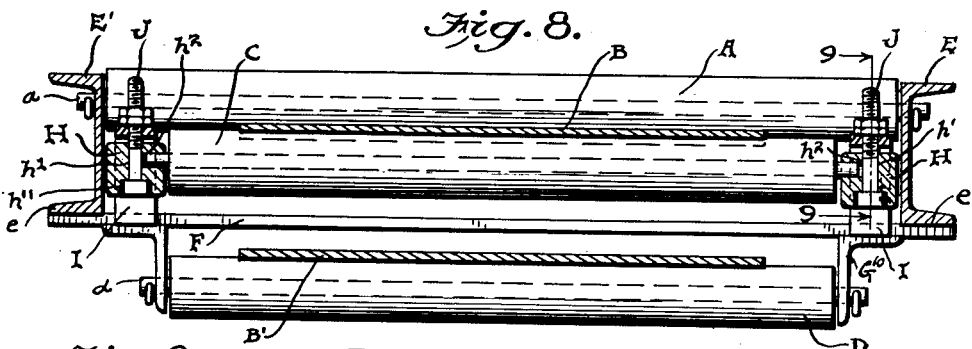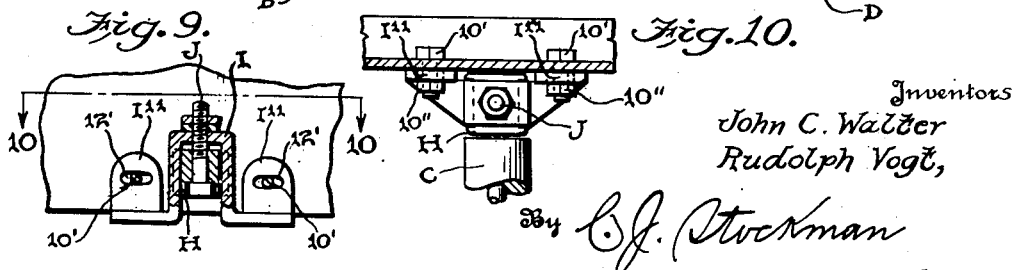

Patented Apr. 11, 1933

1,903,732

UNITED STATES PATENT OFFICE

JOHN C. WALTER AND RUDOLPH VOGT, OF CINCINNATI, OHIO, ASSIGNORS TO THE ALVEY-FERGUSON COMPANY, OF OAKLEY, CINCINNATI, OHIO, A CORPORATION OF OHIO

CONVEYER

Application filed August 9, 1930. Serial No. 474,221.

This invention has relation to that type of conveyers whose load-supporting beds are formed of rollers the undersurfaces of whose bodies are in frictional contact with the working run of an endless traveling belt by which rotative movement on their respective axes is imparted to said rollers, and in which said working run of the belt is supported by a series of rollers operative thereon to cause said run of the belt to engage the load-carrying rollers with sufficient force to assure advancing movement of the load on said rollers. The returning run of the belt in this type of conveyer is supported by a third series of rollers, frictionally engaged therewith.

The primary purpose of the invention is to provide a combination and correlation of parts, together with certain improvements in the elements, from which important economies and also improved results will be obtained, as will be hereinafter more particularly set forth.

In the accompanying drawings wherein like characters of reference denote corresponding parts, two typical embodiments of the invention are illustrated and these embodiments will be described in minute detail without, however, intending thereby to restrict the invention to said details in all respects, since it is recognized that other changes in details may be employed without departing from the spirit of the invention as defined by the appended claims.

In said drawings:—

Fig. 1 is a side elevation of a part of the conveyer embodying our improvements, with a portion broken away to disclose parts which would otherwise be concealed;

Fig. 2 is a plan view of the portion of the conveyer shown in Fig. 1;

Fig. 3 is a transverse sectional view on the line 3—3 of Fig. 2;

Fig. 4 is a sectional view on the line 4—4, Fig. 3, but on a larger scale;

Fig. 5 is a detail sectional view on the line 5—5 of Fig. 1;

Fig. 6 is a view similar to Fig. 1, but showing a slightly changed construction and correlation of parts;

Fig. 7 is a detail plan view of the parts shown in Fig. 6;

Fig. 8 is a cross section on the line 8—8 of Fig. 7;

Fig. 9 is a detail sectional view on the line 9—9 of Fig. 8; and

Fig. 10 is a detail section on the line 10—10 of Fig. 9.

In all figures of the drawings, the load-carrying rollers are marked A, the working run of the endless belt which imparts rotative movement to said rollers is marked B, the returning run of said belt is marked B', the rollers which support the working run B of the belt and are so related thereto and to the load-carrying rollers as to assure frictional engagement between the belt and load-carrying rollers adequate to rotate said rollers when the latter are bearing a load as well as when they are not, are marked C, and the rollers which support the returning run B' of the belt are marked D. The several series of rollers and the belt as thus far referred to may be of any suitable construction and size and their illustrated relationship to each other is not out of the ordinary in this type of conveyers.

In the illustrated embodiments of the invention each load-carrying roller A is rotatably mounted on a stationary axle $a$ whose ends are supported by longitudinal frame members E, E', respectively arranged at opposite sides of the conveyer and connected with each other by transverse tie members F arranged at intervals along the length of the conveyer and having their ends secured by any suitable means to said frame members E, E' to thereby tie the members on the opposite sides of the frame into a substantially unitary structure. The members E, E' are preferably of channel formation and each tie member F in such case will be secured at its opposite ends to the base flanges $e$, $e'$ thereof.

In each illustrated embodiment of the invention the supporting rollers D for the returning run B' of the belt are rotatably mounted on stationary axles $d$ which need not be adjustable and the rollers C which support the working run B of said belt are rotatably mounted on stationary axles $c$. Each end of each axle *c* protrudes from an end of the corresponding roller *c* and is supported by a bearing means which includes a "first member," a "second member" adjustably mounted in and guided by said "first member", and means which co-operate with the "first member" in supporting the "second member" and adjust the latter to, and fix it in, its required position in said "first member". The said "second member" is designated H in all figures of the drawings and is of the same construction in both embodiments of the invention. It provides a bearing block by which the end of a corresponding roller C is carried. The said "first member" is designated I in the embodiment shown in Figs. 1-5, inclusive, and $I^{10}$ in the embodiment illustrated in Figs. 6-10, inclusive, and provides a supporting and guiding member for the bearing block H.

Referring now to the embodiment illustrated in Figs. 1-5, inclusive, it will be noticed that the frame includes longitudinal members G of angle formation and that each member I is formed with oppositely extending base flanges *i* which rest upon and are secured to the flange *g* of the corresponding member G, preferably by bolts 10 and nuts 11, as shown. These bolts extend through elongated openings 12 formed in the base members *i* to thereby permit independent adjustment of the members I, together with their bearing blocks H longitudinally of the frame to thereby correspondingly adjust the rollers C relatively to each other and to the belt and load-carrying rollers. Each member I also includes flat sides *i'*, which are spaced from each other, whose upper ends are connected with one another by a cross member *i"* which forms the top of the member.

The longitudinal frame members G not only support the members I by which the bearing blocks H of the rollers C are supported and guided, but also serve to support the rollers D, the ends of whose axles *d* are shown as extending into openings in blocks *d'* suitably secured to the vertical parts *g'* of said members G.

Each bearing block H is a casting whose opposite sides are formed with broad channels *h* to receive the sides *i'* of the corresponding member I, each of said channels being defined by guiding lips *h'*, *h'* which engage the edges of the corresponding side *i'*. It will be noticed that the sides *i'* of the member I have flatwise engagement with the backs of the channels and that their edges are engaged with the lips *h'*, *h'*. Adjustment of each block is effected through the medium of an adjusting bolt J which extends through the block from top to bottom of the latter and through an opening formed in the top member *i"* of the corresponding member I. Each bolt preferably has at its lower end a head *j* set into the bottom of the corresponding bearing block flush with the under surface of the latter and is provided at its opposite end with a pair of nuts *j'* which rest one upon the other and one upon the top *i"* of the member I and both of which are exposed for convenient access thereto. These nuts co-operate with each other and with said head *j* in raising and lowering the bearing block within the corresponding member I and in maintaining said block against accidental displacement from its thus adjusted position, as will be readily understood.

Each bearing block H is also formed on its inner side with a lateral opening $h^2$ which receives the corresponding end of the axle *c* of the corresponding roller C, whereby the end of said roller is adjusted correspondingly with adjustment of its bearing block.

It will be noticed that this adjustable bearing block H is of such construction that it may be cast throughout and will call for no machine work whatsoever, except the drilling of the opening $h^2$ for the corresponding roller axle. It will be noticed that the mounting of the members I on continuous frame members G, G and the supporting of the rollers D also from said frame members permits the use of rollers C and D whose lengths may be much shorter than would otherwise be required. Each of these features of the applicants' construction produces important economies in the construction of these conveyers. Moreover, the correlation of the adjustable bearing blocks H and the members I and the formation of the latter members with oppositely extending bases having effective bearing on flat frame elements avoids all danger of any change in the vertical adjustment of the rollers C during the horizontal adjustment of said rollers: and furthermore the described correlation permits the adjustable bearings to be located in such a spaced relation with the side, longitudinal, members of the frame that the adjusting nuts will be fully exposed and accessible to a wrench for adjustment.

In Figs. 6-10, inclusive, we have shown a construction in which the guiding and supporting members, marked $I^{10}$, for the adjustable bearing blocks H, are modified to adapt them to be secured directly to the side members E, E' of the frame, and the members G, G, which extend continuously throughout the frame in the construction shown in Figs 1-5, inclusive, are omitted and separate angles, marked $G^{10}$, are employed to support the respective ends of the rollers D. The only change in the guiding and supporting members, marked $I^{10}$, in comparison with the guiding and supporting members, marked I, is in the substitution for the horizontal flanges *i* of angular flanges including tapered horizontal portions $i^{10}$ and vertical portions $I^{11}$, of integral formation. It will be noticed that the horizontal portions $i^{10}$ provide bases of oppositely tapered form from whose inner ends the vertical portions I¹¹ project. This provides a well braced construction having adequate bearing upon the inner surface of the corresponding frame members E, or E'. Each vertical portion I¹¹ is formed with an elongated opening 12' to receive a fastening bolt 10' (Fig. 9) and said opening is horizontally elongated to permit horizontal adjustment of the members I¹⁰ and hence of the corresponding bearing block and end of the corresponding roller, relatively to the corresponding frame member E or E'. It will be understood that the bolts 10' are provided with appropriate fastening nuts 10".

The separate angles G¹⁰ which support the rollers D are suitably secured in this construction to the tie members F and project downward from said members. As already stated, the bearing blocks H of this embodiment of the invention are identical in construction with the bearing blocks of the first described construction and have the same guided relationship with the supporting members and the same beneficial features of construction and adjustment.

Having thus described the invention what we believe to be new and desire to secure by Letters Patent, is:

1. In a conveyer, an adjustable bearing means for a roller thereof, including an adjustable member having two opposite sides formed with guiding channels each having longitudinal lips at its opposite sides, and a third side formed with an opening to receive an axial projection from the corresponding end of the roller, said member also formed with a through-opening, the bearing means also including a supporting and guiding member in which the adjustable member is slidably mounted, said supporting and guiding member having spaced flat sides seated in said guiding channels with their bodies respectively in flatwise engagement with the backwalls of the channels and their edges in contact with the lips formed by said channels, the supporting and guiding member also having a wall which connects its said sides with each other at one of its ends and flanges at its opposite ends to attach it to a member of the conveyer frame, and said bearing means also including adjusting means including an element which extends through the through-opening in the adjustable member and through the wall connecting the sides of the supporting and guiding member with each other and is operative to adjust said adjustable member, said element having devices at its opposite ends to engage the adjustable member and wall, respectively.

2. A structure according to claim 1 and in which the wall of the guiding and supporting member overlies the upper surface of the adjustable supporting member and the devices at the opposite ends of the adjusting element comprise a head set into the bottom of the adjustable member and an adjusting nut above the connecting wall of the supporting and guiding member.

3. A bearing means for the end of a conveyer roller, said bearing means comprising a first member and a second member slidably mounted in the first member, together with means cooperating with the first member for supporting the second member and for fixing the latter in the position to which it has been set in said first member; said second member having a block-like body two of whose opposite sides are formed with substantially broad channels and one of whose remaining sides is formed with an opening to receive an axial projection from the corresponding end of the roller; the first member having spaced flat sides which are fitted to the channels in the sides of the second member and a top member which overlies the top of said second member, said sides also having, at their lower ends, elements, including lateral flanges, for securing the bearing means in position; said supporting and fixing means including an element extending from the upper end of the second member through the top of the first member and provided with means operative thereon to adjust the second member and to hold the same in adjusted position.

4. A conveyer comprising a frame, a series of load-carrying rollers, an endless belt to impart rotative movement to said rollers, a series of adjustable rollers engaging the working run of the belt and operative to press the same against the load-carrying rollers, and bearing means for the adjustable rollers, respectively, each of said bearing means including an adjustable member supporting the end of the corresponding roller and having two opposite sides formed with broad guiding channels each having longitudinal lips at its opposite sides, a guiding and supporting member in which the adjustable member is slidably mounted, the guiding and supporting member having flat spaced sides respectively having flatwise engagement with the bottoms of the respective channels and edgewise engagement with the lips of said channels, the guiding and supporting member also having a member connecting its sides with each other and flanges secured to the frame, and an adjusting means for each adjustable member, including an element which extends through the connecting wall of the guiding and supporting member and has a head at one end and a holding element at its other end, respectively engaged with said wall and the end of the adjustable member remote from the wall.

5. A structure according to claim 4 and wherein the frame has longitudinal side members by which the load-carrying rollers are supported and the bearing means for the adjustable rollers are disposed substantially between the horizontal planes of the top and bottom of said side members.

6. A conveyer according to claim 4 and wherein the frame includes longitudinal members separate from those by which the load-carrying rollers are carried and to which separate longitudinal members the guiding and supporting members for the adjustable bearings are secured and from which said members project upwardly.

7. A conveyer according to claim 4, in which the frame has a first pair of longitudinal side members by which the load-carrying rollers are supported and a second pair of longitudinal members by which the bearing means for the adjustable rollers are supported and from which said bearing means project upwardly, and in which also a separate series of rollers are carried by the second pair of longitudinal members and support the returning run of the belt.

8. A conveyer according to claim 4 in which the frame includes a first pair of longitudinal side members which carry the load-supporting rollers, and a second pair of longitudinal members to which the guiding and supporting members for the adjustable bearing are secured and from which said members project upwardly, transversely disposed tie members connecting the lower ends of the first pair of frame members with each other and from which the second pair of frame members project downwardly, and a second series of rollers carried by the second pair of frame members and positioned to engage the returning run of the belt.

9. A conveyer according to claim 4 in which the frame includes transverse tie members and also includes a second series of belt engaging rollers arranged below the horizontal plane of said tie members in position to engage the returning run of the belt together with supporting means for the latter rollers carried by said tie members.

10. A bearing means for the end of a conveyer roller, said bearing means comprising a first member and a second member slidably mounted in the first member, together with means cooperating with the first member for supporting the second member and for fixing the latter in the position to which it has been set in said first member; said second member having a block-like body two of whose opposite sides are formed with substantially broad channels and one of whose remaining sides is formed with an opening to receive an axial projection from the corresponding end of the roller; the first member having spaced flat sides which are fitted to the channels in the sides of the second member and a top member which overlies the top of said second member, said sides also having lateral flanges projecting in opposite directions from their lower ends and formed with horizontally elongated openings to receive elements by which the bearing may be secured adjustably to the frame of a conveyer; said supporting and fixing means including an element extending from the upper end of the second member through the top of the first member and provided with means operative thereon to adjust the second member and to hold the same in adjusted position.

11. A bearing means for the end of a conveyer roller, said bearing means comprising a first member and a second member slidably mounted in the first member, together with means cooperating with the first member for supporting the second member and for fixing the latter in the position to which it has been set in said first member; said second member having a block-like body two of whose opposite sides are formed with substantially broad channels and one of whose remaining sides is formed with an opening to receive an axial projection from the corresponding end of the roller; the first member having spaced flat sides which are fitted to the channels in the sides of the second member and a top member which overlies the top of said second member, said sides also having, at their lower ends, flanges which include oppositely tapered horizontal portions and vertical portions projecting from the inner ends of said horizontal portions, said vertical portions having horizontal elongated openings to receive elements by which the bearings may be secured adjustably to the frame of a conveyer; and said supporting and fixing means including an element extending from the upper end of the second member through the top of the second member and provided with means operative thereon to adjust the second member and to hold the same in adjusted position.

12. A conveyer comprising a frame, a series of load-supporting rollers carried by said frame, an endless belt the upper surface of whose working run is engaged with said rollers, a series of belt-supporting rollers engaging the undersurface of the working run of said belt, and bearing means for the ends of the latter rollers; each of said bearing means comprising a first member and a second member slidably mounted in the first member, together with means cooperating with the first member for supporting the second member and for fixing the latter in the position to which it has been set in said first member; said second member having a block-like body two of whose opposite sides are formed with substantially broad channels and one of whose remaining sides is formed with an opening which receives an axial projection from the end of the corresponding belt-supporting roller; said second member having spaced flat sides which are fitted to the channels in the sides of the second member and also having a top which overlies the top of said second member, said sides having means, including lateral flanges, for securing the bearing means to said frame; said supporting and fixing means including an element extending from the upper end of the second member through the top of the second member and provided with means operative thereon to adjust the second member and to hold the same in adjusted position.

13. A conveyer according to claim 12, in which the frame includes a first pair and a second pair of longitudinal members, and the load-supporting rollers are carried by said first pair and the bearing means are carried by said second pair, and in which, also, the lateral flanges project from the lower ends of the sides of the first members of the respective bearing means and are formed with openings which are elongated in the direction of the length of the conveyer and through which extend elements of the means by which the bearing means are secured adjustably to said second pair of frame members.

14. A conveyer according to claim 12, in which the frame includes a pair of longitudinal members, having substantially vertical faces by which the load-supporting rollers are carried, and the lateral flanges project from the lower ends of the sides of each second member and include oppositely tapered substantially horizontal portions and substantially vertical portions, the latter projecting from the inner ends of said horizontal portions and lying against the substantially vertical faces of said frame members and having openings which are elongated in the direction of the length of the conveyer and through which extend elements of the means by which the bearing means are secured adjustably to the second pair of frame members.

In testimony whereof we affix our signatures.

JOHN C. WALTER.
RUDOLPH VOGT.